United States Patent
Binder

(10) Patent No.: US 6,604,892 B2
(45) Date of Patent: Aug. 12, 2003

(54) COLLECTION CONTAINER FOR BULK MATERIAL WITH A CONVEYING PUMP OR A SUCTION TUBE

(75) Inventor: Bruno Binder, Dornhan (DE)

(73) Assignee: TBE Habermehl Anlagenbau GmbH & Co. KG, Butzbach-Ebersgönz (DE)

( * ) Notice: Subject to any disclaimer, the term of this patent is extended or adjusted under 35 U.S.C. 154(b) by 6 days.

(21) Appl. No.: 09/970,835

(22) Filed: Oct. 4, 2001

(65) Prior Publication Data

US 2003/0047498 A1 Mar. 13, 2003

(30) Foreign Application Priority Data

Oct. 5, 2000 (DE) .......................... 100 49 626
May 27, 2001 (DE) ...................... 201 09 330 U

(51) Int. Cl.⁷ .............................................. B65G 53/44
(52) U.S. Cl. ..................... 406/80; 406/134; 406/151
(58) Field of Search ............................. 406/79, 80, 81, 406/122, 134, 151; 198/443, 379.06, 379.01

(56) References Cited

U.S. PATENT DOCUMENTS 2,678,241 A * 5/1954 Miller .......................... 406/58
3,612,617 A * 10/1971 Scherz ......................... 406/80
3,896,942 A * 7/1975 Couture et al. ............... 406/80
3,980,186 A 9/1976 Leith
4,352,606 A * 10/1982 Julke ........................... 406/81
4,635,408 A 1/1987 Burke et al.
5,932,094 A 8/1999 Binder et al.

FOREIGN PATENT DOCUMENTS

| DE | 25 41 583 A1 | 3/1977 |
| DE | 82 34 176 U1 | 12/1983 |
| DE | 84 18 523 U1 | 9/1984 |
| DE | 35 23 549 A1 | 1/1987 |
| DE | 36 11 606 A1 | 10/1987 |
| DE | 94 19 379 U1 | 3/1995 |
| EP | 0 750 966 A1 | 8/1999 |

* cited by examiner

Primary Examiner—Joseph A. Dillon
(74) Attorney, Agent, or Firm—Alston & Bird LLP

(57) ABSTRACT

In a collection container for bulk material with a conveying pump (204) or a suction tube arranged off center, with a container wall (202), and a substantially level container bottom, at least one removing arm (210) is adapted for movement in the vicinity of the container bottom. The removing arm (210) is arranged on a traction means and guided in the region of the container wall (202).

20 Claims, 8 Drawing Sheets

COLLECTION CONTAINER FOR BULK MATERIAL WITH A CONVEYING PUMP OR A SUCTION TUBE

BACKGROUND OF THE INVENTION

The present invention relates to a collection container for bulk material with a conveying pump or a suction tube.

EP 0 750 966 A1 discloses a collection container that includes a conveying pump for conveying liquid media with production residues, for example, chips, coolants, and lubricants. The collection container is designed and constructed as a cylindrical pot with a substantially flat container bottom. A centrally supported removing arm operating above the container bottom guides the chips deposited on the container bottom to the conveying pump. However, such a collection container still leaves much to be desired.

Furthermore, DE 36 11 606 A1 discloses an apparatus for emptying a silo with a discharge opening arranged in the center, in which the bulk material is moved toward the center by means of a plurality of drag chains, which are mounted with their one end to a driven chain extending in the region of the container wall, and with its other end to a carrousel arranged in the center. The containers may be made circular or polygonal.

Disclosed in DE 94 19 379 U1 is a discharge device for hard-to-transport bulk materials, wherein in a cylindrical container, for example, a silo or the like, the bulk material is supplied to a discharge opening extending transversely across the bottom by means of a rigid removing arm, which connects to a rotating annular frame and pivot bearings in the center.

Further rotating devices for conveying bulk materials to a discharge opening or the like are known from DE 25 41 583 B2 and DE 82 34 176 U1.

DE 84 18 523 U1 discloses a discharge device in the form of a sliding frame for bunkers with a circular or a polygonal cross section. In this device, the sliding frame is reciprocated by means of two hydraulic cylinders, whereby the bulk material is supplied to a channel extending crosswise through the entire bunker.

SUMMARY OF THE INVENTION

In accordance with one aspect of the present invention, an improved collection container is provided. According to this aspect, the collection container includes a substantially level container bottom and a container wall extending upright with respect to the container bottom. Further in accordance with this aspect, at least one removing arm adapted for movement in the vicinity of the container bottom is provided, with the removing arm being arranged on a traction means, by which it can be moved. The removing arm is guided in the region of the container wall. As a result of gravity, the removing arm is held during its horizontal movement on the container bottom, and it mixes the bulk material that may be present in a dry form, or in a carrier medium, for example, water. When the bulk material is present in a dry form, the bulk material may be removed by suction through a tube, for example, via vacuum conveying air. When the bulk material is present in a liquid carrier medium, removal by suction will occur via a conveying pump. To ensure a satisfactory removing behavior, it is possible to reinforce the removing arm in a region further removed from the traction means. Based on its construction, it is possible to use the apparatus of the present invention in collection containers of nearly any desired shape with a substantially level bottom. In particular, the collection container may replace the collection tray in a metal-cutting machine.

In the collection container, the traction means circulates preferably in the vicinity of the container wall. It can thereby be ensured that abrasives are fully collected from the entire container bottom. In this connection, it is possible to provide a slide rail.

A satisfactory guidance of the removing arm is ensured by mounting it to the traction means via two points arranged in horizontally spaced relationship. According to a particularly preferred variant, the removing arm is mounted to the traction means in one point, and in a subsequent region, it is in contact with the container wall for sliding therealong. Preferably, the traction means is a chain, which runs over sprockets arranged in corners or curves of the container wall. A suitable number and arrangement of the sprockets permits realizing almost any desired shapes of collection containers. Furthermore, it is possible to realize in a simple manner modular systems for any dimensions of collection containers. As an alternative, embodiments using ropes and corresponding deflection pulleys are possible. Possible are sizes from 0.2 m×0.2 m to 200 m×20 m. Likewise, a corresponding device may be used in a collection container of almost any desired design with substantially straight portions of the side walls.

A satisfactory clearing effect is provided by a removing arm having a V-shape in the direction of movement. In this instance, the extension of the legs is important and not the exact design of the intermediate area. Likewise, it is quite possible to use U-shaped removing arms with an open U, i.e., not parallel extending legs. Advantageously, the removing arm is made symmetrical with respect to its normal direction of movement, i.e. the angle bisecting line in the vertex is directed in the direction of movement. In this connection, the angle between the angle bisecting line and each leg of the removing arm should be at most 45°, preferably 30°, so as to effect an optimal conveyance of the bulk material being collected.

According to a further, particularly advantageous embodiment, the end of the removing arm close to the wall leads the end of the removing arms close to the interior. In this instance, the removing arm is preferably V-shaped, with its end close to the interior forming with respect to the direction of movement an angle of at least 90°, preferably 92°, and preferably at most 100°.

The suction effect of the conveying pump for the bulk material in the collection container may be assisted in that the conveying pump is arranged substantially directly above a region, which is passed by the removing arm. In this arrangement, the approximately V-shaped removing arm passes with its vertex in the vicinity of the center of the suction opening of the conveying pump. It is also possible to provide a plurality of conveying pumps and/or suction openings.

The use of a plurality of removing arms increases the conveying capacity. The lengthened or enlarged construction of a removing arm permits clearing even the center area of the collection container, and prevents the removing arms from overlapping. To this end, the leg directing toward the interior is made longer. Furthermore, a plurality of removing arms improve the proportioning of the bulk material supply for the conveying pump. Thus, smaller quantities of bulk material, which are easier to remove by suction, are supplied more often.

According to a preferred embodiment, the collection container includes a slide rail along the container wall, and on a leg that trails with respect to the direction of movement, the removing arm is provided with a projection, which lies against the slide rail.

Preferably, at least one inner removing arm with a drive is provided in the collection container inside the circulating traction means. It is also possible to provide a plurality of drives, each being associated to at least one removing arm. Such an arrangement is especially suitable for very large collection containers or for collection containers with such a plan form that it is not possible to clear the entire container bottom by the outer removing arm or arms.

According to a preferred embodiment, the inner removing arm rotates about a vertical axis, and advances the bulk material from the inside outward. Advantageous is a spiral configuration of the inner removing arm, with the spiral opening opposite to the direction of rotation. It will be also advantageous, when in the direction of movement or rotation, the inner removing arm is at least in part somewhat flattened, and includes on its side, in the direction of movement or rotation, a lateral surface serving as a slide section.

Preferably, the inner removing arm circulates faster than the outer removing arm, in particular the inner removing arm is driven in the same direction of movement or rotation for performing more circulations per unit time than the outer removing arm.

In order that the removing arms clear the area as completely as possible, the clearing areas of the outer and the inner removing arm or arms overlap. According to a preferred embodiment, the outer removing arm, in particular the longer outer removing arm is entrained by the faster circulating and thus passing inner removing arm so far that same is able to pass it, preferably without lifting it from the bottom. To this end, the outer removing arm is mounted to the traction means for pivoting in the direction of movement.

As an alternative, at least one drive is driven or controlled with the same direction of rotation as a function of the circulation speed of the traction means and/or of at least one additional drive, so that no interference occurs.

According to a further, preferred embodiment, the collection container accommodates one or more depressors, which press down and distribute accumulations of bulk material, so that the collection container can be kept very low, and the chip breaker is prevented from being hindered by accumulations. To this end, the depressor has preferably an inclination, which reduces the spacing between the depressor and the container bottom in the direction of movement of the removing arm.

According to another preferred embodiment, the collection container accommodates a centering device, which centers the bulk material caught by the removing arms such that it can be optimally taken hold of by the conveying pump. The centering device may be formed, for example, by brushes, push plates, cyclically revolving centering worms, or slides, or scavenging jets.

According to a particularly preferred embodiment, the bulk material is concentrated by the deflection of the removing arms resulting from their forward-back-forward movement.

To prevent an intake of the removing arm, same preferably includes a device which interrupts the generally flat surface, so as to enable a flow past the removing arm, to prevent the removing arm from being raised from the container bottom and the bulk material from possibly getting thereunder, and to avoid impedance to the forward movement of the removing arm. Preferably, the device is formed by ribs, which may project upward from the removing arm, but are preferably realized by providing cavities in the removing arm. As an alternative, it is also possible to provide in the removing arm openings, in particular bores.

BRIEF DESCRIPTION OF THE DRAWINGS

Figure 1:
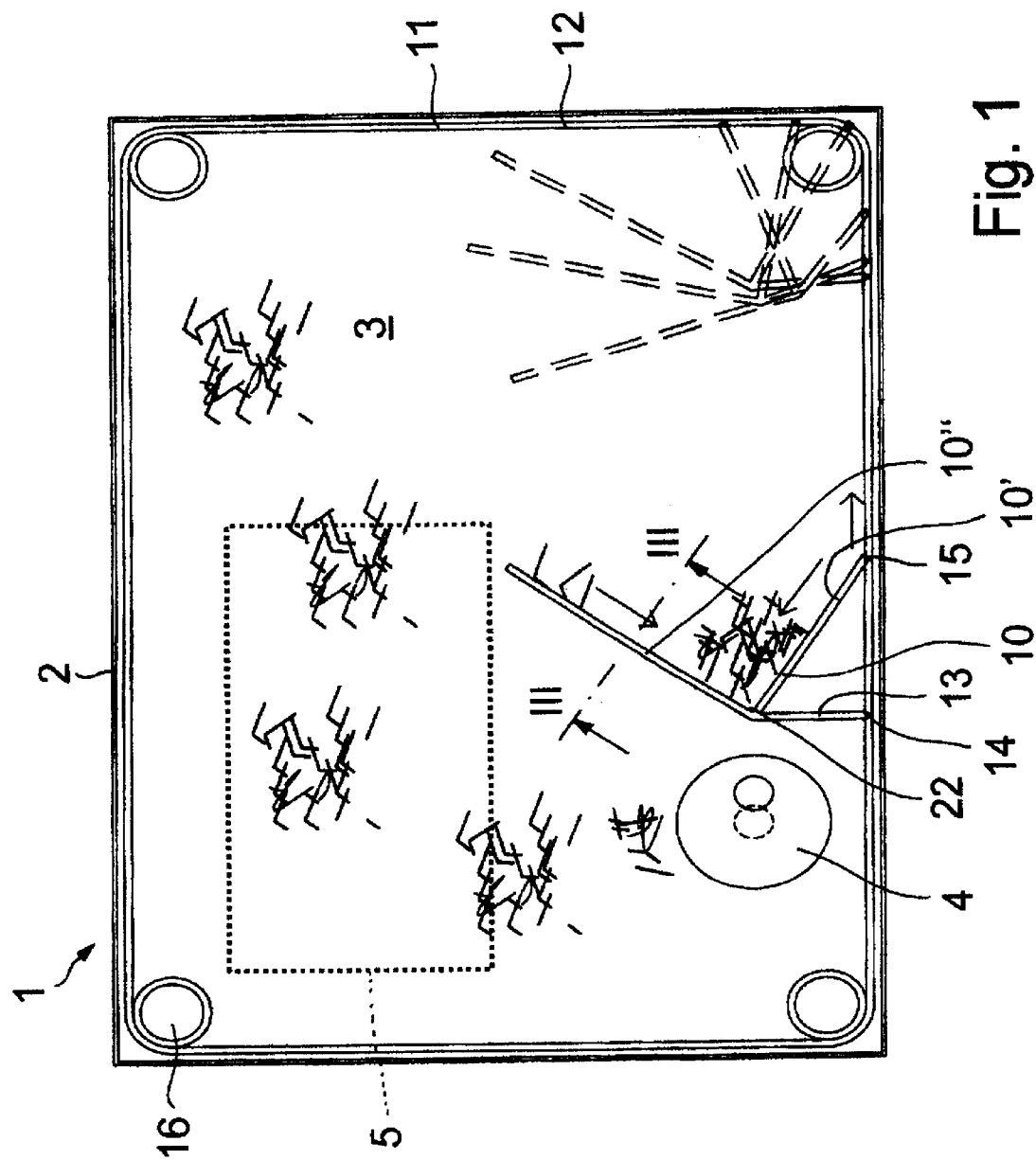
Figure 2:
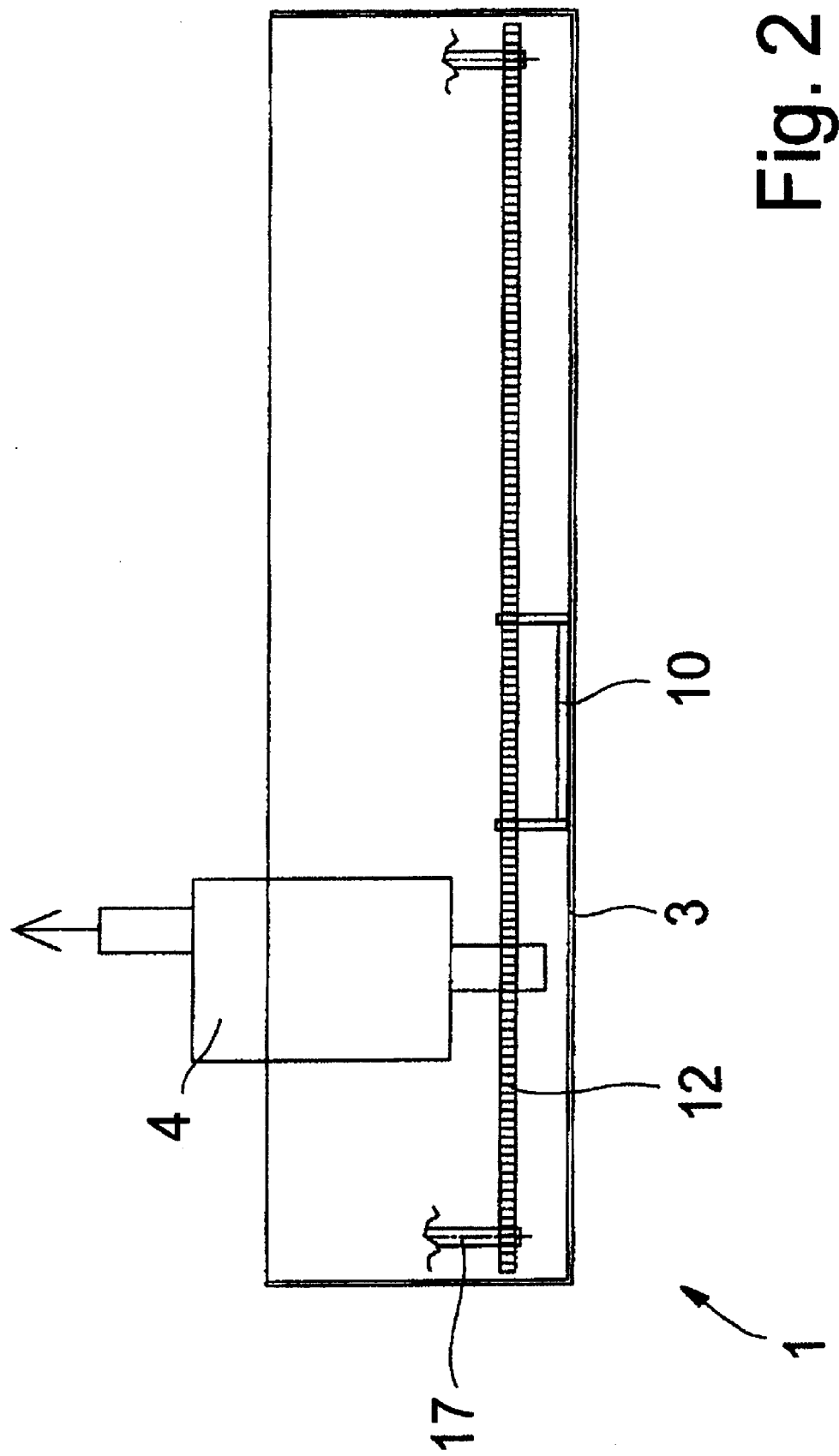
Figure 3:
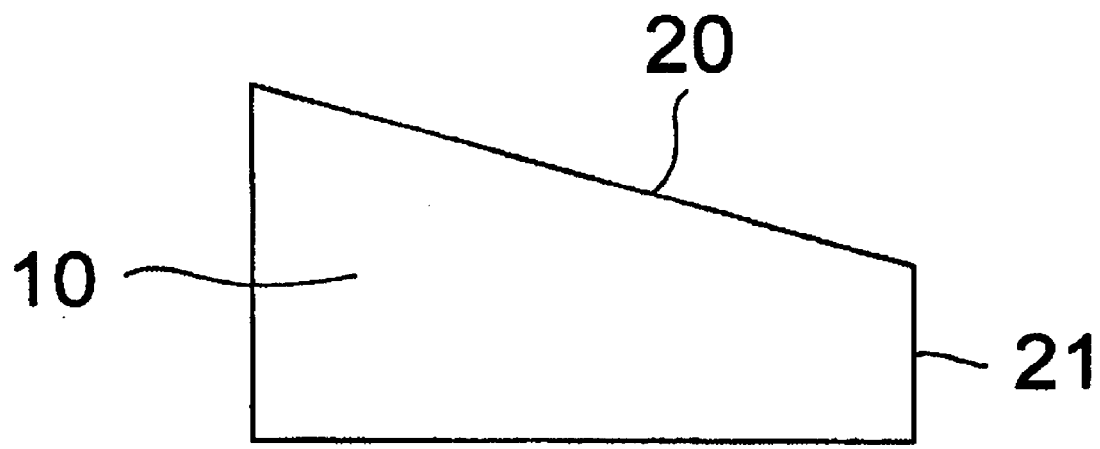
Figure 4:
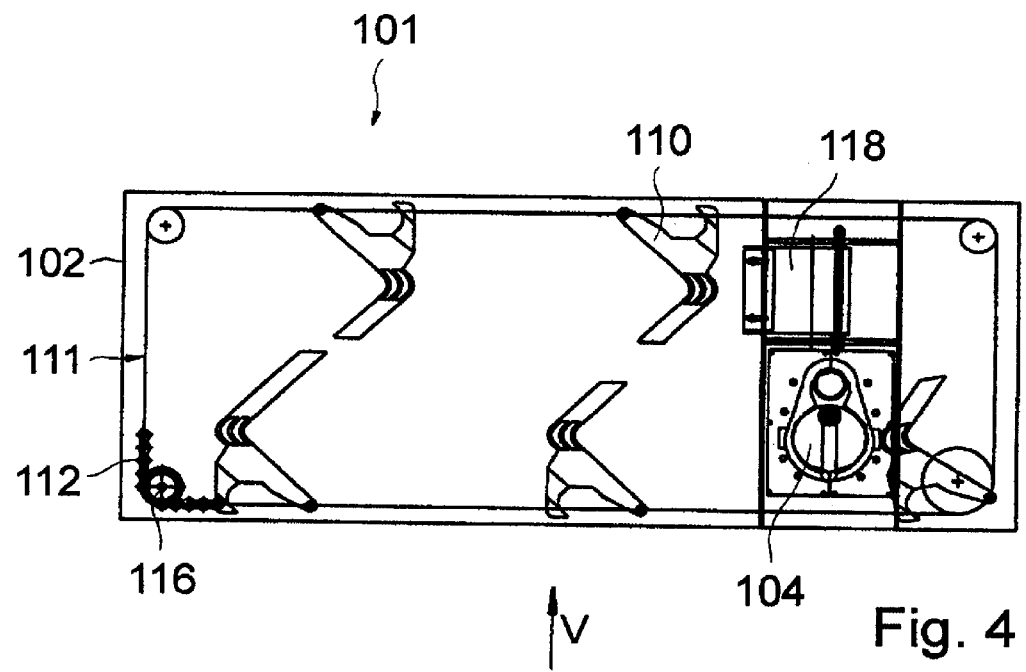
Figure 5:
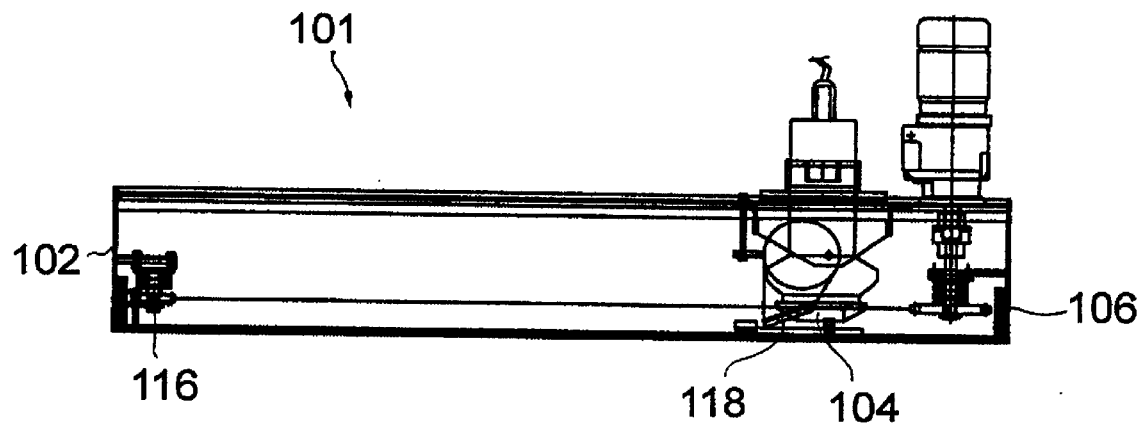

Having thus described the invention in general terms, the invention will now be described in greater detail with reference to a plurality of embodiments, which are shown in part in the accompanying drawings, wherein:

FIG. 1 is a schematic top view of a first embodiment;

FIG. 2 is a schematic side view of FIG. 1;

FIG. 3 is a sectional view of a removing arm along line III—III of FIG. 1;

FIG. 4 is a schematic top view of a third embodiment;

FIG. 5 is a schematic side view, as seen in the direction of arrow V of FIG.

Figure 6:
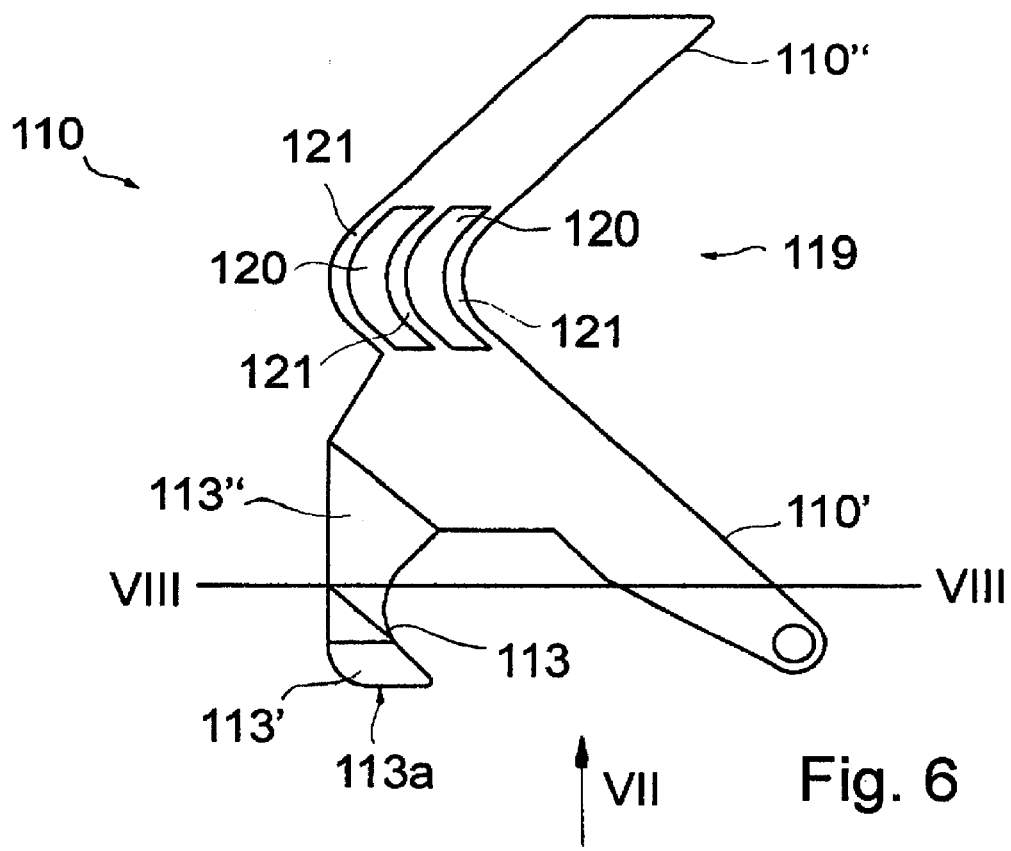
Figure 7:
Figure 8:
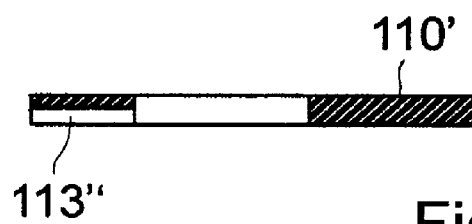
Figure 9:
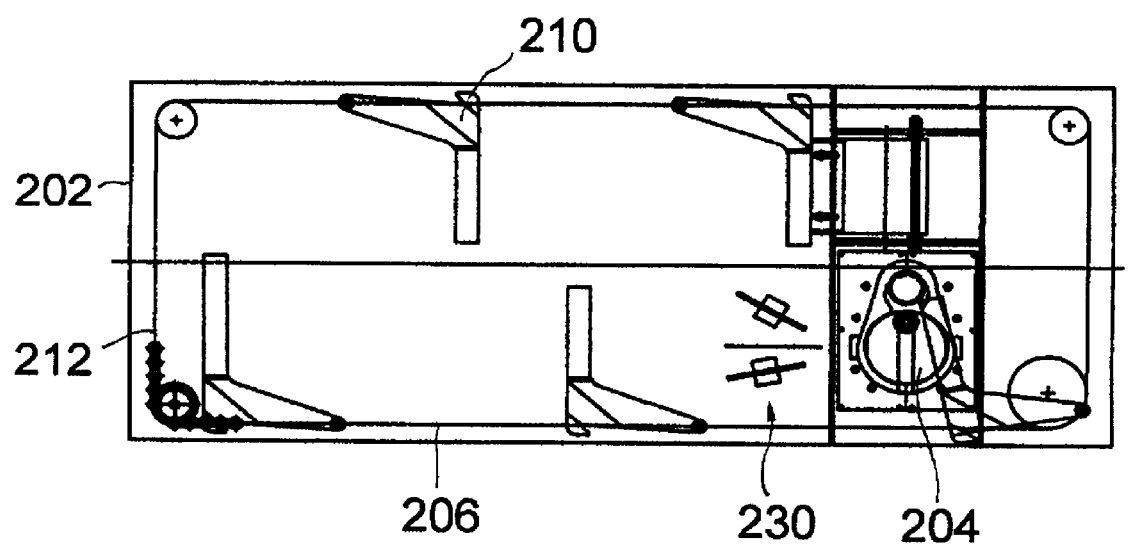
Figure 10:
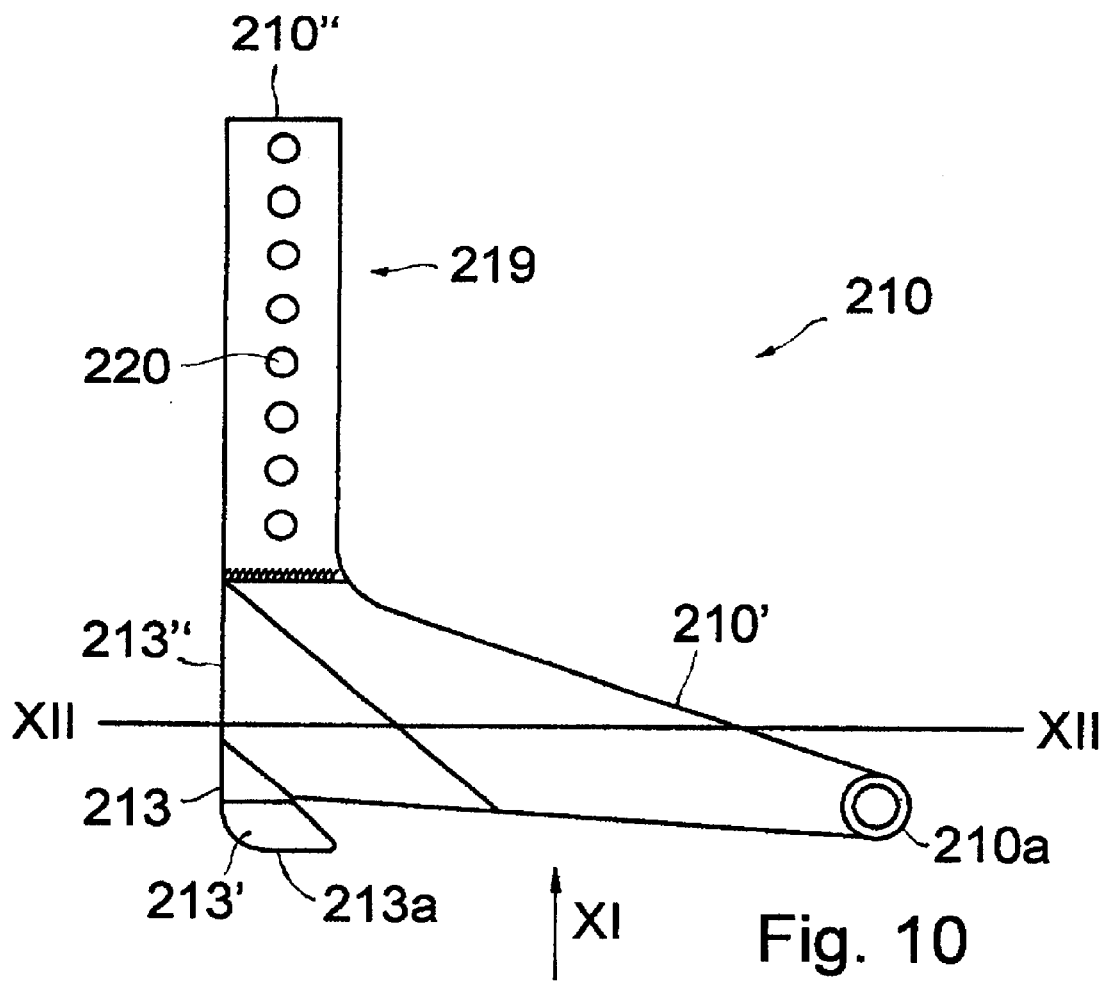
Figure 11:
Figure 12:

FIG. 6 is a view of the removing arm according to the third embodiment;

FIG. 7 is a side view of the removing arm, as seen in the direction of arrow VII of FIG. 6;

FIG. 8 is a sectional view of the removing arm of FIG. 6 along line VIII—VIII;

FIG. 9 is a schematic top view of a fourth embodiment;

FIG. 10 is a view of the removing arm of the fourth embodiment;

FIG. 11 is a side view of the removing arm, as seen in the direction of arrow XI of FIG. 10;

FIG. 12 is a sectional view of the removing arm along line XII—XII; and

Figure 13:
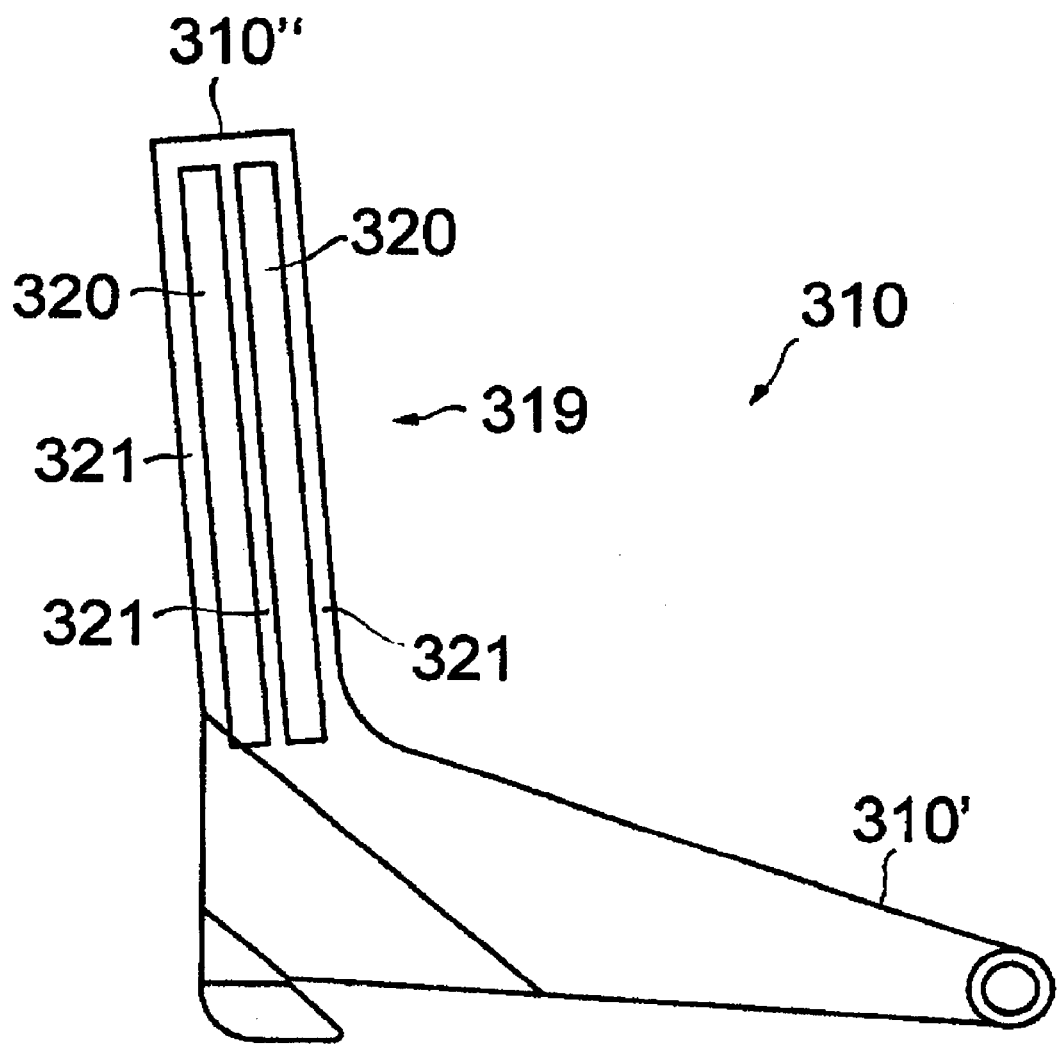

FIG. 13 is a view of the removing arm of a fifth embodiment.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 illustrates a first embodiment with a collection container 1 for bulk material, which is contained in water as a carrier medium. However, the carrier medium may be any fluid; for example, the carrier medium can also be air. According to the embodiment, the collection container 1 measures 1.5 m long and 1 m wide. The collection container 1 comprises a peripheral container wall 2 and a substantially level container bottom 3 (see FIG. 2). As schematically indicated in FIG. 1, a conveying pump 4 extends into the interior of collection container 1. With the aid of this pump, it is possible to remove the bulk material by suction. According to the embodiment, the suction opening is spaced about 1.5 cm from the container bottom 3. Indicated in dotted lines at 5 is a chip breaker, which produces the bulk material, in the present embodiment metal shavings. However, a chip breaker 5 need not be necessarily present.

Arranged in the interior of collection container 1 is a substantially V-shaped removing arm 10 with two legs 10' and 10", which can be moved with the aid of a flexible traction means 11. The traction means 11 as provided according to the embodiment is a chain 12 with a counter-clockwise direction of movement as indicated by an arrow closely adjacent the chain 12 in FIG. 1. The chain 12 is somewhat spaced from the container bottom 3 (see FIG. 2). The removing arm 10 is attached to chain 12 at two mounting points, namely via a leg 13 to a mounting point 14 located to the back, with respect to the direction of movement, and at a mounting point 15 located substantially directly in the front, with respect to the direction of movement. The mounting point 15 mounts the leg 10' of V-shaped removing arm 10 to the chain 12. In this arrangement, the V-shaped removing arm 10 lies substantially on the container bottom 3. The leg 13 is somewhat spaced from the container bottom 3, so that a kind of tunnel is formed, which is about 1 to 2 cm high in the embodiment.

The chain 12 runs over sprockets 16 arranged in corners or curves of the container wall 2 of collection container 1, and it is driven via one of the sprockets 16 by a motor (not shown). The sprockets 16 are arranged on axles or shafts 17, which end somewhat above container bottom 3, so that when accordingly designed and constructed, the removing arm 10 is also able to carry along metal shavings, which have been deposited below chain 12.

On the right side at the bottom, FIG. 1 shows the sequence of movements of removing arm 10 (each movement being shown in phantom lines), in one corner of the collection container 1. The leg 10", which extends into the interior of collection container 1, temporarily performs a rearward movement, during which it could be slightly raised. In the event that particles of the abrasives have gotten behind removing arm 10, a second passage over this area will again make it possible to entrain likewise these particles.

As shown in FIG. 3, the removing arm 10 has a substantially trapezoidal cross section, with its upper side 20 sloping downward transversely to the longitudinal direction of leg 10" or 10'. A narrow lateral surface 21 forms a pushing surface for the metal shavings. Essentially, the removing arm 10 measures 3 cm wide and 1 cm high. Reinforcements are provided in the vertex 22, but they are not shown for purposes of simplifying the drawing. Other configurations are possible, for example, like the blade of a snow plow.

According to the first embodiment, the V-shaped removing arm 10 is not made symmetrical with respect to the normal direction of movement. With its vertex 22, it forms between its two legs 10' and 10" an angle of 90°. The leg 10" directed toward the interior of collection container 1 forms in the embodiment, an angle of 60° with the normal relative to a straight horizontal connection of the mounting points 14, 15. The leg 10" ends approximately at the level of the end of leg 10', which corresponds to the mounting point 15 relative to a normal in mounting point 15. Other angles and length ratios are possible. In this instance, one may refer in particular to the second embodiment. The leg 13, which connects the removing arm 10 to its rearward mounting point 14 (with rearward in this context being defined with respect to the direction of movement), ends likewise in vertex 22. The mounting point 14 is located approximately at the same level as vertex 22 relative to the normal in mounting point 14.

The removing arm 10, which is being moved along container bottom 3 with the aid of chain 12, engages with is lateral surface 21, serving as a pushing surface, metal shavings that lie on the container bottom 3. In so doing, the chain 12 is moved at a traction speed of 8 to 15 m/min. These metal shavings are moved in the direction of vertex 22, where they are removed by suction, upon reaching conveying pump 4. This prevents metal shavings from depositing, and ensures a collection of the bulk material contained in collection container 1. The flexibility of the connection to the chain 12 will prevent the removing arm 10 from jamming, if sediments tightly adhering to the container bottom 3 have already formed for whatever reasons. A stationary arrangement of pump 4 in a region that is passed in closest vicinity by the vertex 22 of removing arm 10 additionally assists the removal by suction.

According to a second embodiment not shown in the drawings, a plurality of removing arms are provided. In this embodiment, each removing arm is made symmetrical, so that the angle bisecting line in the vertex extends in the normal direction of movement. The two legs each define with the angle bisecting line an angle of 30°, so that an opening angle of 60° is formed. As a result of their symmetrical configuration, both legs equally act as a slideway for the bulk material. For purposes of being able to clear likewise the area in the center, one removing arm is made longer than the other removing arms by lengthening only the leg that directs toward the interior.

FIGS. 4–8 show a third embodiment. For the sake of simplicity, components having the same function as in first embodiment are indicated by numerals increased by 100.

In collection container 101, removing arms 110 advance along container wall 102 by being pulled with traction means 111 in the form of a chain 112, which runs in the corners over sprockets 116. Each removing arm 110 includes two legs 110' and 110", with leg 110" being directed toward the interior of collection container 101. The legs 110' and 110" define an angle of 90° therebetween, with the bisecting line of the angle pointing in the direction of movement. At an end 110a of leg 110' near the container wall 102, a bore is provided, which is engaged by a connecting means (not shown) and forms a connection with chain 112. In the rear region of leg 110', a further leg 113 is formed, which includes, near the container wall 102, a clearing projection 113' in the vicinity of its end 113a. This clearing projection 113' serves to advance inward the bulk material, in particular metal shavings, which have accumulated in the direct vicinity of container wall 102, so that they can be entrained by a following removing arm 110. To do so, the center region of leg 113 is provided with a milled cut 113", which forms a corresponding slide surface with respect to which the metal shavings slide (note FIGS. 6 and 8). In the case of leg 113, the milled cut 113" defines an angle of 45° with respect to the direction of movement. The corresponding angle may also range from 30° to 60°.

Along container wall 102, guide rails 106 are provided, which can be characterized as being part of or in addition to the container wall, and along which the legs 113 slide. To this end, a slide surface of end 113a contacts the guide rails 106 in a straight movement of removing arm 110.

Furthermore, the collection container 101 accommodates a depressor 118, which levels larger accumulations of shavings and sees to it that metal shavings which are jammed below a removing arm 110 are released and can subsequently be taken in by the conveying pump 104 and be removed from the collection container 101. To this end, the depressor 118 has an inclination that reduces the free space between removing arm 110 and depressor 118 in the direction of movement of the removing arm 110. The depressor 118 is formed by a weight-loaded flap. According to the present embodiment, the pressure corresponds to a load from 8 to 15 kg. The depressor 118 also ensures that the removing arms 110 are not raised by metal shavings, and that no metal shavings build up, so that low overall heights are possible without adversely affecting the function of the chip breaker (not shown), which is arranged at a very low height.

As can be noted from FIG. 6 in the region of the transition from leg 110' to leg 110", a device 119 is provided, and in the present embodiment the provided device is or includes milled cutouts 120. This device prevents the removing arm 110 from being engaged by conveying pump 104 and pulled in front of the suction opening. According to the present embodiment, two milled cutouts 120 are provided, so as to form in this region three ribs 121. However, any other devices are possible, which interrupt a continuous flat surface of the removing arm 110.

A fourth embodiment as shown in FIGS. 9–12 comprises removing arms 210 with an inner leg 210" extending substantially perpendicularly to the direction of movement, and an outer leg 210' extending slightly obliquely to the direction of movement. Corresponding to the foregoing embodiment, the leg 210' includes at its end 210a a bore, in which a connecting means (not shown) engages and forms a connection to chain 212.

According to the fourth embodiment, the leg 213 is arranged in the rear region between the two legs 210' and 210", with the clearing projection 213' and the end 213a projecting only slightly in the direction of container wall 202, so as to be able to engage behind slide rail 206. A milled cut 213" in leg 213 corresponds to that of the foregoing embodiment.

To prevent an intake by conveying pump 204, the device 219 in the fourth embodiment is provided with bores 220 in leg 210".

For concentrating the bulk material, a centering device 230 is provided in the direction of circulation shortly before conveying pump 204. The centering device 230 concentrates the bulk material from the outside and the inside in a point in front of removing arm 210, so that it can be optimally taken in by conveying pump 204. The centering device 230 of the present embodiment is provided with brushes. However, any other solutions for purposes of concentrating bulk material are possible.

According to a fifth embodiment as shown in FIG. 13, the removing arm 310 includes a leg 310" extending toward the interior and defining an angle of 92° to 100° with respect to the direction of movement. This prevents metal shavings, in particular long metal shavings, from jamming and adhering in the region of the angle. Metal shavings that nonetheless become engaged in removing arm 310 can be moved slowly toward the container center, where they separate from removing arm 310, and are engaged by another removing arm 310, which continues to convey them, so that even these metal shavings reach the conveying pump, and can be taken in by same. Based on the geometric configuration, the metal shavings slide slowly in the direction of the end of leg 310". With the aid of a centering device, as is described, for example, with reference to the fourth embodiment, it is possible to push the metal shavings again together and supply them directly to the conveying pump.

If it is intended, for example, for manufacturing reasons, to advance the metal shavings to the conveying pump in a simplest way possible, it will be possible to use in the case of a removing arm, as is shown in FIG. 10, the turning or deflecting movement in the corners, i.e., in the deflection points, to the end that the metal shavings move outward in the direction of the container wall, and can thus be supplied to the conveying pump. Ideally, the conveying pump is arranged shortly behind a deflection point. In any event, the forward-back-forward movement of the removing arms in the deflection points assists the concentration of the metal shavings irrespective of the geometric configuration of the removing arms.

Similarly to the removing arm 110 of the third embodiment, the leg 310" includes two milled cutouts 320 over approximately its entire length, so that three ribs 321 are formed, which constitute the device 319 that prevents the conveying pump from engaging the removing arm 310.

A sixth embodiment not shown in the drawing is a variant, which is suitable in particular for large collection containers and/or complicated shapes of a collection container. In this embodiment, the principle of one or more removing arms that are pulled with the aid of a chain essentially corresponds to that of the foregoing embodiments.

A triangular collection container having the outline of an equilateral triangle includes two V-shaped removing arms circulating along its container walls, with one of the removing arms having a longer leg directing toward the interior of the collection container. Otherwise, the geometric configuration of the removing arms corresponds to that of the removing arm 10 of the first embodiment. Each removing arm is moved with the aid of a chain along the container bottom. The removing arm is connected for movement with the chain in one mounting point. Furthermore, in the place of the second, rearward located mounting point 14, the removing arm lies against the container wall, and is guided by same. The removing arms advance the bulk material, in particular metal shavings, to a conveying pump, which is arranged in the region of the vertex of the two legs.

The container bottom includes an inner region, which cannot be cleared by the removing arms. To remove from this region metal shavings or the like, a removing device with, for example, six inner removing arms is provided, which is driven for rotation by means of a drive. The inner removing arms are mounted to the removing device such that they are able to lift from the container bottom, if need arises, for preventing a jamming. Each inner removing arm is made in spiral form, with the spiral increasing opposite to the direction of rotation. The spiral may also be approximated by, for example, straight or circular sections. Each inner removing arm advances the bulk material from the inside outward, so that it reaches the region of the leg of the longer, outer removing arm, and that it can be advanced further outward from same or, if need be, likewise from the leg of the outer removing arms, and be supplied to the conveying pump.

The inner removing arms are driven by the drive faster than the circulating, outer removing arms are moved by the traction means, so that the inner removing arms pass the outer removing arms. The inner removing arms interfere with the longer, outer removing arm. When being passed, the longer, outer removing arm is entrained by the passing, inner removing arm, whereby its leg is raised from the container wall. Once the inner removing arm has passed the longer, outer removing arm, the leg comes again into contact with the container wall.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A collection container for bulk material, comprising:
a container having a substantially level container bottom and a container wall extending upright with respect to the container bottom;
a suction device for sucking the bulk material from the container at a suction position that is off center with respect to a top plan view of the container bottom; and
traction means for pulling at least one removing arm to move the removing arm in the vicinity of and relative to each of the container bottom, the container wall and the suction position, so that the removing arm moves the bulk material to proximate the suction position and the suction device sucks the bulk material that is proximate the suction position from the container.

2. A collection container according to claim 1, wherein the container bottom includes a center region in the top plan view of the container bottom, the removing arm is a first removing arm that does not extend to the center region of the container bottom, and the collection container further comprises a second removing arm operative for moving over the center region of the container bottom for clearing the bulk material from the center region of the container bottom.

3. A collection container according to claim 1, further comprising an inner removing arm that is within the collection container and that the traction means extends around.

4. A collection container according to claim 1, wherein the removing arm is mounted to the traction means at a mounting point, and the removing arm includes a region that contacts the container wall or a guide arrangement that is positioned within the container.

5. A collection container according to claim 1, wherein the traction means includes a chain which runs over sprockets arranged in corners or curves that are defined by the container wall.

6. A collection container according to claim 1, wherein the removing arm includes two legs which are arranged at an angle relative to one another.

7. A collection container according to claim 1, further comprising a depressor located at a positioned within the container such that the removing arm moves past the depressor, and so that the depressor engages the removing arm to urge the removing arm toward the container bottom while the removing arm moves past the depressor.

8. A collection container according to claim 1, wherein the traction means is for moving the removing arm along a path that extends in the vicinity of the container bottom, the container wall and the suction position, so that the removing arm moves the bulk material along the path to proximate the suction position and the suction device sucks the bulk material from the container, wherein the collection container further comprises a centering device that is positioned in the collection container proximate the path at a position upstream from the suction position, and wherein the centering device is operative for engaging and concentrating the bulk material moving along the path so that the suction device sucks the concentrated bulk material from the suction position.

9. A collection container according to claim 1, wherein the traction means is for:
moving the removing arm along a path that extends in the vicinity of the container bottom, the container wall and the suction position, so that the removing arm moves the bulk material along the path to proximate the suction position and the suction device sucks the bulk material from the container; and
causing back and forth movements of the removing arm which cause the bulk material being moved along the path to be concentrated.

10. A collection container according to claim 1, wherein the removing arm includes a flat surface that passes in the vicinity of the suction position and includes discontinuities that inhibit the removing arm from occluding an inlet to the suction device.

11. A collection container according to claim 1, wherein the suction device includes a conveying pump.

12. A collection container according to claim 1, wherein the traction means is mounted for circulating in the collection container along a path that extends in the vicinity of the container wall.

13. A collection container according to claim 12, wherein the path along which the traction means circulates includes an at least generally straight section.

14. A collection container according to claim 1, wherein:
the removing arm includes opposite first and second ends, with the first end being closer to the container wall than the second end;
the traction means is for moving the removing arm along a direction of movement that extends in the vicinity of the container bottom, the container wall and the suction position; and
the removing arm is shaped so that the first end leads the second end while the removing arm is moved along the direction of movement.

15. A collection container according to claim 14, wherein the removing arm is generally V-shaped, with the second end defining an angle of at least 90° relative to the direction of movement.

16. A collection container according to claim 15, wherein the second end defines an angle of at most 100° relative to the direction of movement.

17. A collection container according to claim 14, wherein the removing arm is generally V-shaped, with the second end defining an angle of at least 92° relative to the direction of movement.

18. A collection container according to claim 17, wherein the second end defines an angle of at most 100° relative to the direction of movement.

19. A collection container for bulk material, comprising:
a container having a substantially level container bottom and a container wall extending upright with respect to the container bottom;
a suction device for sucking the bulk material from the container at a suction position that is off center with respect to the container bottom in a top plan view of the container bottom;
an flexible driving device extending around the suction position and mounted for moving in a continuous circuit that extends around the suction position and proximate the container wall; and
at least one removing arm mounted to the flexible driving device for being pulled by and moving with the flexible driving device,
wherein the flexible driving device and the removing arm are configured so that the removing arm travels along a path while moving with the flexible driving device, with the path extending in the vicinity of each of the container bottom, the container wall and the suction position, so that the removing arm moves the bulk material to proximate the suction position and the suction device sucks the bulk material from the container.

20. A collection container according to claim 19, wherein the continuous circuit includes an at least generally straight section.

* * * * *